April 18, 1967 C. W. HEWLETT, JR 3,315,236
ELECTROLYTIC SYSTEM FOR SAMPLING AND STORING INFORMATION
Filed Nov. 14, 1963

INVENTOR.
CLARENCE W. HEWLETT JR.
BY
W.J. Shanley Jr.
HIS ATTORNEY 3,315,236
ELECTROLYTIC SYSTEM FOR SAMPLING AND STORING INFORMATION
Clarence W. Hewlett, Jr., Hampton, N.H., assignor to General Electric Company, a corporation of New York
Filed Nov. 14, 1963, Ser. No. 323,795
8 Claims. (Cl. 340—173)

This invention relates to a system for sampling analog information, and more particularly to a system capable of not only accurately sampling the analog information, but also of accurately storing the sampled information for long periods of time.

Systems of this type have been found to be extremely useful in many types of information handling systems. However, the prior art types of systems which are capable of accurately performing both functions have generally been found to be unnecessarily complex and therefore unnecessarily costly. For example electromechanical systems that utilize motor driven potentiometers have been found to be unnecessarily bulky and expensive due to the necessity of providing a drive motor for each information source. Electronic systems which make use of feedback capacitors in cooperation with high input impedance amplifiers have also been found to be expensive since they require amplifiers which have very high input impedances in order to adequately perform the storage function for any length of time.

It is therefore an object of this invention to provide a simplified inexpensive and highly accurate system for sampling and storing analog information.

It is another object of this invention to provide a system for sampling and storing analog information in which the information being stored is continuously available at the output of the system.

It is another object of this invention to provide a new and improved information sampling and storage system by utilizing a device which may be initially arranged in a configuration for sampling applied analog information and may be thereafter selectively connected in a storage configuration which will result in storing the analog information being sampled.

These and other objects and advantages of the invention may best be understood by reference to the following description taken in conjunction with the accompanying drawing in which.

In accordance with this invention a sampling and storage system may be provided by utilizing an integrating device capable of being electrically read-out in cooperation with switching means utilized for selectively connecting the integrating device in a sampling or a storage configuration.

An electrochemical device capable of functioning as an electrical readout integrator has been found to be ideally suited for performing both the sampling and the storage function. These devices which have become known as solions are four electrode electrochemical cells which contain an electrolyte for permitting the passage of a current to be integrated between an input electrode and a common electrode. The electrolytic solution utilized is a solution of a reversible redox system; i.e. a system in which the ionic conduction between two electrodes results in the reduction of one species of the ions in solution at one of the electrodes and the corresponding oxidation of the other species of the ion at the other electrode of the system so that there is no net change in contents of the cell.

When solions are utilized as a current integrating means the passage of current between the input and common electrodes changes the quantity of the measured species in the integral compartment. The read-out electrode, which is located to define the integral compartment in cooperation with the common electrode, is utilized to indicate the concentration of the measured species in the integral compartment by measuring the magnitude of the read-out current. Thus, the read-out current will be proportional to the charge transferred between the input and common electodes to provide the desired integration function.

Figure 1:
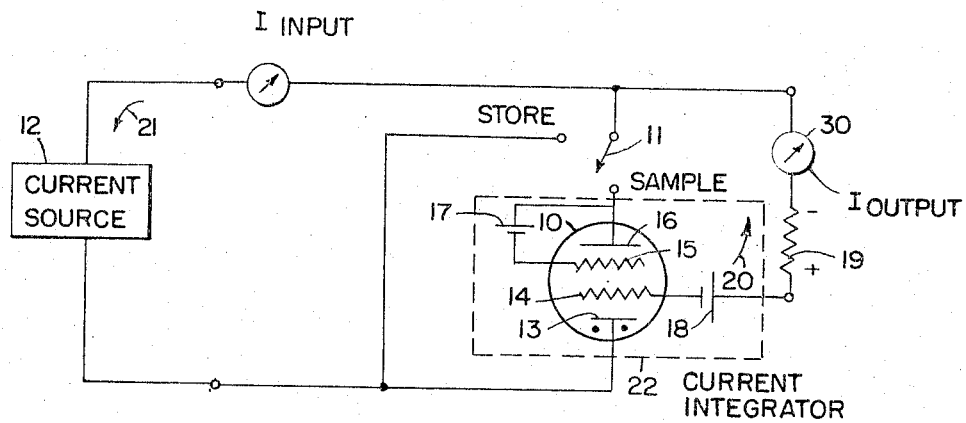
FIG. 1 is a schematic representation of the basic form of this invention.

Referring now to FIG. 1, I have illustrated the basic form of my invention in which solion 10 is utilized as a current integrating means which cooperates with switching device 11 to selectively perform either a sampling or a storage function with respect to the analog information represented by the input current 21 which is supplied from current source 12. Solion 10 is comprised of an enclosure containing an electrolyte in which there is immersed a common electrode 13, read-out electrode 14, shield electrode 15, and input electrode 16. These electrodes are formed from a metal which is inert in the electrolyte. For example, platinum electrodes are commonly used with the electrolytes normally used.

A redox system which has been commonly utilized is an aqueous solution containing a small amount of iodine and a comparatively large amount of potassium or sodium iodide. This results in a solution containing iodide ions and tri-iodide ions, the latter of which will hereinafter be referred to as iodine. In such a redox system, iodine becomes the measured species of the ion of the solution. Further information concerning the manner of construction or theory of operation of solion 10 is not disclosed herein since solions are now well known in the art and such information is not necessary for a complete understanding of my invention.

Bias battery 17 provides means for properly biasing shield electrode 15 with respect to input electrode 16. Bias battery 18 in turn provides the proper bias between read-out electrode 14 and common electrode 13 so that the read-out current 20 traversing read-out electrode 14 will be proportional to the concentration of the measured species in the integral compartment. Thus, the current flowing in output resistor 19, the magnitude of which may be indicated by ammeter 30, will be proportional to the integral of the charge passed between input electrode 16 and common electrode 13. The resistance of resistor 19 should be small in value in order to prevent the voltage drop developed across it from becoming significant with respect to the voltage of battery 18. For example, with a normal maximum read-out current of a few milliamps and with bias battery 18 equal to .3 v., resistor 19 should be of the order of 10 ohms.

Switch 11 provides means for selectively arranging solion 10 in either its sampling configuration or its storage configuration. It can be seen that when switch 11 is in the SAMPLE position the current flowing between input electrode 16 and common electrode 13 will be the difference between the output current which flows in the direction indicated by arrow 20 and the input current which flows in the direction indicated by arrow 21. Assuming now that input current 21 is larger than output current 20, and assuming further that switch 11 is operated to its SAMPLE position, the difference current will be in the direction to cause an increase in the measured species in the integral compartment. This increase in concentration of measured species will be evidenced by an increase in output current 20 until output current 20 equals input current 21. When this condition is reached no further current will flow between the input and common electrodes. Assuming now that input current 21 decreases in value so as to be smaller than output current 20, a reversal in direction of the difference current will result so that the current flow through the solion is now in a direction to decrease the concentration of the measured species in the integral compartment. This will cause a drop in output current which will continue until the difference current returns to zero. Thus, it can be seen that when switch 11 is in its SAMPLE position, the input circuit of solion 10 is connected to receive the difference between the input and the output currents, the difference current being phased so as to cause the output current to follow the input current.

Thus, when switch 11 is operated to its STORE position, output current 20 will normally be equal to the input current 21 at the time the switch leaves is SAMPLE position. The operation of switch 11 to the STORE position effectively disconnects the input circuit of solion 10 from both current source 12 and the output circuit. The output circuit is now returned to common electrode 13 to connect the solion in its storage configuration. In this configuration, since no current can be applied to the input circuit of the solion, the concentration of the measured species in the integral compartment will remain constant at whatever value it had assumed thus resulting in the continuous flow of output current of constant magnitude between the read-out electrode and common electrode 13. It can thus be seen that output current 20 will remain at whatever value it had assumed at the time that switch 11 was operated from its SAMPLE to its STORE position.

Thus, in accordance with my invention, current integrating means 10 may be selectively connected to continuously sample or follow an analog signal and thereafter store the information being sampled at the time it is connected in its storage configuration.

As is well known in the prior art, the electrochemical redox system in a solion must be completely reversible in order for it to accurately perform its integrating function. This will obtain as long as the applied voltages stay below the potential at which other ions enter into the reaction at the electrodes. For example, we must avoid the generation of a gaseous by-product the pressure of which would destroy the cell. This requires the selection of proper bias voltages and limiting the magnitude of signals applied to the solion so that the electrodes and the electrolytic of the solion do not enter into an electrochemical reaction which is irreversible. For this reason, bias batteries 17 and 18 normally provide .3 volt when an aqueous iodide-iodine solution is utilized.

Figure 2:
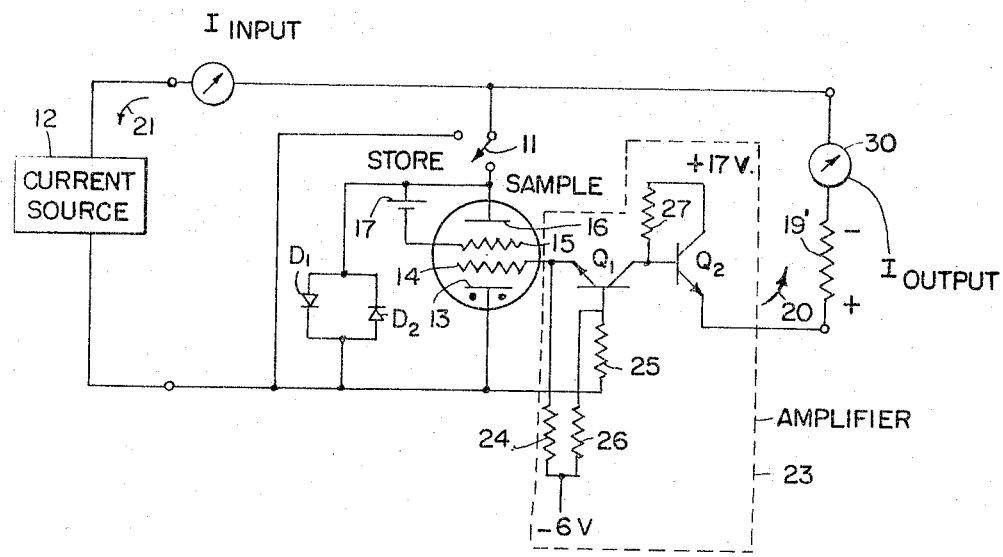
FIG. 2 is a schematic representation of the preferred embodiment of this invention.

Since the maximum read-out current of solion 10 not only limits the speed of response of the system when in its sampling configuration, but also limits the maximum input current that can be sampled and stored by the basic configuration of FIG. 1, it can be seen that the embodiment of FIG. 2 is the preferred embodiment since provisions are made therein for amplifying the read-out current to permit the generation of larger output currents. This also permits load resistor 19' to be larger in magnitude so that larger voltages can be developed in the output circuit.

Amplifier 23 is comprised to transistor Q1 arranged in a common base configuration to operate as a voltage amplifier to provide the input signal for driving transistor Q2 which is connected in the common emitter configuration to operate as a current amplifier. Resistor 24, which is connected between read-out electode 14 and a −6 volt supply, operates as a constant current source and thus provides a phase reversal between the read-out current and the emitter of transistor Q1. The proper operating point for read-out electrode 14 is provided by resistors 25 and 26 which determine the voltage on the base of Q1. This voltage, plus the base-emitter drop, determines the potential of read-out electrode 14. As previously indicated, this potential should be of the order of .3 to .4 volt for proper operation of the solion.

Collector load resistor 27, which is connected between a +17 volt source and the collector of Q1, has developed a voltage signal which controls the potential of the base of Q2 with respect to ground, and thus it controls the amplified output current 20.

Assuming that the read-out current increases in value due to the passage of current from the common to the input electrode, the emitter current of transistor Q1 will correspondingly decrease since the current flowing through resistor 24 must remain constant. This decrease in Q1 emitter current will result in a corresponding decrease in its collector current to thus drive the base of Q2 in a positive direction to increase the output current 20. As was previously indicated, output current 20 will continue to increase until it is equal to input current 21 at which point no further charge will be applied to solion 10 thus resulting in the read-out current remaining at a constant value as long as the input current does not change in magnitude.

The operation of switch 11 from its SAMPLE to its STORE position will have substantially no effect upon the magnitude of output current 20 since in either position the output circuit is returned to substantially the same potential; i.e., ground potential. Input electrode 16 of solion 10 normally remains very close to ground potential when switch 11 is in its SAMPLE position since diodes D1 and D2 are provided to prevent it from exceeding ±.6 volt. As was previously indicated, this is necessary to prevent destruction of solion 10 by limiting the applied difference signal to a value that will prevent an irreversible reaction at the electrodes.

While there has been described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. In combination with a source of input current which varies in magnitude, current integrating means having input, output, and common terminals,
    said current integrating means providing an output current at said output terminal, the magnitude of which is directly proportional to the integral of the current which has been passed between said input and common terminals, said output current increasing in magnitude as long as said common terminal is positive with respect to said input terminal,
    a load circuit, means for connecting one side of said load circuit to said output terminal,
    said source of input current being connected between said common terminal and the other side of said load circuit, and
    switching means for selectively connecting the point common to said source and said load circuit to either said input terminal or said common terminal,
    said input and output currents flowing in directions such that the difference between these currents will traverse said input terminal when said selective connecting means connects said common point to said input terminal,
    said input source being polarized so that its positive terminal is connected to said common terminal.

2. The combination of claim 1 in which said current integrating means comprises an electrochemical cell containing as an electrolyte a solution of a reversible redox system,
    said input, common, and output terminals being individually connected to a common, an input, and a read-out electrode, respectively, said electrodes being in communication with said electrolyte,
    a pair of oppositely polarized uniconductive devices connected in parallel between said input and common electrodes for limiting the magnitude of voltage appearing between these electrodes to a value which will prevent the occurrence of an irreversible chemical reaction in said cell.

3. The combination of claim 2 in which said connection between said readout electrode and said output terminal comprises means for amplifying the current flowing from said readout electrode in order to permit the generation of larger output currents and thus permit the sampling of correspondingly larger input currents.

4. The combination of claim 3 in which said amplifying means comprises voltage amplifying means for generating a voltage signal in response to the current from said readout electrode and,
current amplifying means for generating said output current in response to said voltage signal.

5. A system for sampling the magnitude of an input current and storing the sampled value comprising current integrating means having input, output, and common terminals, said integrating means providing at said output terminal an output current which is proportional to the integral of the input current passed between said input and common terminals,
switching means for connecting when in a first condition, said input terminal and said output terminal so that the difference between said input and output currents will pass through said integrating means between said input and common terminals,
said switching means serving when in a second condition to effectively disconnect said input current from said input terminal while connecting said output terminal to said common terminal whereby,
said integrating means provides when said switching means is in said first condition an output current equal in value to the last value of said input current, said integrating means providing when said switching means is in said second condition a substantially constant output current having a value which is substantially equal to said last sampled value of input current.

6. The combination of claim 5 in which said current integrating means comprises an electrochemical cell containing as an electrolyte a solution of a reversible redox system,
said input, common, and output terminals being individually connected to a common, an input, and a readout electrode, respectively, said electrodes being in communication with said electrolyte,
a pair of oppositely polarized uniconductive devices connected in parallel between said input and common electrodes for limiting the magnitude of voltage appearing between these electrodes to a value which will prevent the occurrence of an irreversible chemical reaction in said cell.

7. The combination of claim 6 in which said switching means between said readout electrode and said output terminal additionally comprises means for amplifying the current flowing from said readout electrode in order to permit the generation of larger output currents and thus permit the sampling of correspondingly larger input currents.

8. The combination of claim 7 in which said amplifying means comprises voltage amplifying means for generating a voltage signal in response to the current from said readout electrode and,
current amplifying means for generating said output current in response to said voltage signal.

References Cited by the Examiner
UNITED STATES PATENTS 3,211,968  10/1965  Grams et al. _____ 340—13

BERNARD KONICK, *Primary Examiner.*

TERRELL W. FEARS, *Assistant Examiner.*